United States Patent
Tokumoto et al.

[11] Patent Number: 6,040,562
[45] Date of Patent: Mar. 21, 2000

[54] STRUCTURE FOR UNIFORM HEATING IN A HEATING DEVICE

[75] Inventors: Masahisa Tokumoto; Eiji Ishibashi, both of Kitakyushu, Japan

[73] Assignee: Kabushiki Kaisha Kyushu Nissho, Japan

[21] Appl. No.: 08/991,007

[22] Filed: Dec. 15, 1997

[30] Foreign Application Priority Data

Nov. 13, 1997 [JP] Japan ..................................... 9-312461
Nov. 13, 1997 [JP] Japan ..................................... 9-312469

[51] Int. Cl.⁷ ...................................................... B23K 3/00
[52] U.S. Cl. ........................... 219/530; 219/523; 219/520
[58] Field of Search .................................... 219/530, 520, 219/523, 390; 338/59

[56] References Cited

U.S. PATENT DOCUMENTS

| | | | |
|---|---|---|---|
| 3,286,082 | 11/1966 | Norton | 219/540 |
| 3,943,323 | 3/1976 | Smith et al. | 219/85 |
| 4,147,925 | 4/1979 | Belinkoff | 219/530 |
| 4,223,208 | 9/1980 | Kleinschimdt et al. | 219/530 |
| 4,230,934 | 10/1980 | Ter Beek et al. | 219/421 |
| 4,230,935 | 10/1980 | Meixner | 219/523 |
| 4,268,741 | 5/1981 | O'Brein | 219/439 |
| 4,376,244 | 3/1983 | Gellert | 219/530 |
| 4,551,616 | 11/1985 | Buttery | 219/460 |
| 4,728,780 | 3/1988 | Uchino | 219/530 |
| 4,993,945 | 2/1991 | Kimmelman et al. | 433/30 |
| 5,256,857 | 10/1993 | Curhan et al. | 219/202 |
| 5,471,034 | 11/1995 | Kawate et al. | 219/485 |
| 5,796,074 | 8/1998 | Edelstein et al. | 219/390 |

Primary Examiner—Teresa Walberg
Assistant Examiner—Daniel L. Robinson
Attorney, Agent, or Firm—Griffin, Butler, Whisenhunt & Szipl, LLP

[57] ABSTRACT

There is provided a uniform heating structure in the heating device formed in the shape of a hollow block made of a heat-resistant metal, in which the surface of the heating device is used as a heat transfer surface, and a high thermal-conductivity material with a thermal conductivity higher than the thermal conductivity of the metal is located adjacent to the heat transfer surface in such a manner that heat can be transferred to the heat transfer surface.

10 Claims, 8 Drawing Sheets

STRUCTURE FOR UNIFORM HEATING IN A HEATING DEVICE

BACKGROUND OF THE INVENTION

1. Field of the Invention

The present invention relates to structural means for heating, that incorporate a block heater for use when bonding a chip to a lead frame using an adhesive, or for a heating roller for fusing a toner image in an electronic photocopying machine, or for dies into which a molten synthetic resin is injected for manufacturing a molding, etc., in a production process for semiconductors, for example. The invention is concerned more particularly with structural means for uniform heating that can heat an object evenly by uniform conduction of heat.

2. Description of the Related Art

When manufacturing semiconductors, for instance, there is a process in which a metal strip is fed in as a frame material, a plurality of lead-frame patterns are manufactured and arranged using progressive-feed dies, a predetermined length of the metal strip is heated, and a chip is bonded onto the mounting surface of the lead frame pattern using a metal adhesive. In the bonding process, it is required that the metal strip should be heated uniformly over the entire area in the longitudinal and lateral directions, and a block heater is widely used for heating the metal strip uniformly. In the process for bonding chips when manufacturing semiconductors, the metal strip is fed intermittently and heated by a block heater which is or is not in contact with the strip.

An example of a block heater consists of a main block unit with a rectangular parallelepiped shape using, a heat-resistant metal, and a heater is embedded inside the main block unit, as a heat source. And, a current is applied to the heater from outside to heat the main block unit totally, and in the case of bonding, for instance, an adhesive such as a metal paste is cured by the heat transferred from the main block unit.

In this type of bonding process, it is particularly important to heat the object, i.e., the total surface of the lead frame accurately and uniformly. More explicitly, when all or part of the surface of the main block unit is used as heat transfer surface for the lead frame, the heat will not be evenly transferred to the entire surface of the lead frame unless the temperature distribution on the whole heat transfer surface is uniform. If uneven heat transfer occurs, irregular curing of the metal paste may take place, and eventually, might result in distortion of the lead frame. In addition, such distortion may produce a crack in a chip, and as a result, the quality or performance of the product might be affected adversely.

As described above, it is very important to maintain a uniform distribution in the amount of transferred heat. However, with the block heater, a heater element is embedded in the block unit and sealed, so there is considerable difficulty in achieving a uniform temperature distribution on the heat transfer surface. Therefore, a somewhat uneven transmission of heat cannot be avoided completely. With a conventional block heater known in the prior art, there is an uneven distribution of transferred heat as shown in FIG. 16A and FIG. 16B.

Figure 16A:
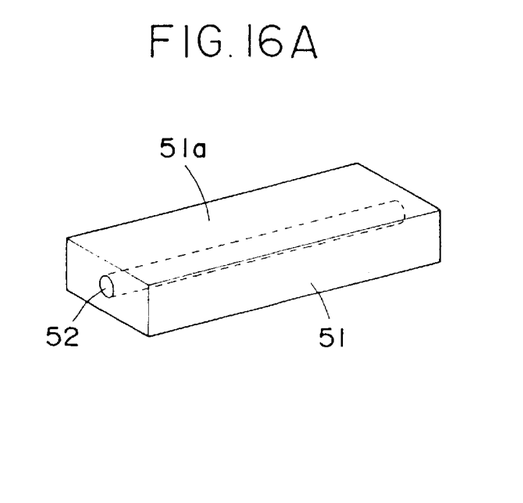
FIG. 16A is an approximate view.
Figure 16B:
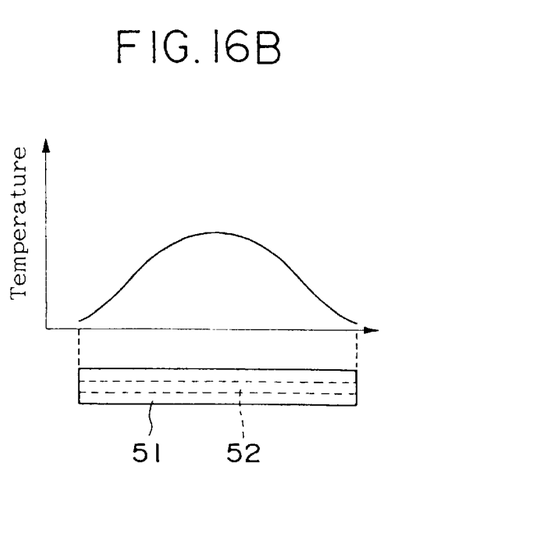
FIG. 16B is a general view showing the temperature distribution of the heat transmission surface.

Referring to FIG. 16A, when the main block unit 51 is shaped simply as a parallelepiped and the heater 52 is shaped as a rod with a circular cross section, for the purpose of simplifying the manufacturing process, the heat transmission surface 51a at the upper end surface of the main block unit 51 has the temperature distribution shown in FIG. 16B. That is because the main block unit 51 is heated by heat conduction from the heater 52 and dissipates heat from the heat transfer surface 51a. Therefore, near an axial end of the heater 52, the amount of transferred heat is smaller than at the center portion. Furthermore, because heat is also dissipated from the end surfaces of the block unit 51, the temperature of the block surface becomes lower towards both ends of the block unit 51.

The temperature distribution of such a block heater might be improved by modifying the shape of the block unit 51 appropriately, or by optimizing the arrangement or disposition of the heater 52, at least to some extent.

However, if the block unit 51 is shaped with extraordinary specification, the shape must be designed individually according to the size and shape of the object being heated, so a main block unit may not be put in common use. Also if the arrangement of the heater 52 is improved, the structure would be more complicated, therefore it might be impossible to restructure an existing block heater into another shape which will make the heat transmission uniform.

On the other hand, a conventional electronic photocopying machine is provided with a heat-fusing device in which a developed toner image is transferred to a paper sheet, and then the image is fused by melting the toner. With such a heat-fusing device, it is very important that the heat transfer from the heating roller to the paper sheet should be uniform, that is, the sheet should be heated with an even temperature distribution. Therefore, to obtain a uniform temperature distribution on the periphery of a heating roller, various effective means have been disclosed in the Japanese Unexamined Patent Publications Nos. 1-157083 and 3-267976, for example.

According to the inventions described in these publications, certain effects can be expected in producing a uniform temperature distribution in a heat-fusing roller. However, although the uniformity of the temperature distribution of the roller can be improved for heat-fusing a toner image, the roller cannot be readily applied to other fields of use.

In more detail, when fusing a toner image on a paper sheet, the periphery of a roller is not stressed so much by external loads and also a stress concentration thereto is rather small. Therefore, as shown in Japanese Unexamined Patent Publication No. 3-267976, the outer periphery can be composed of a cylinder made of a second metal with a high thermal conductivity and low mechanical strength. However, in the case of a printing hot roller or the like which is highly loaded on its periphery, with this method, it would be important to prevent flaws developing on the outer surface of the periphery. Consequently, it is not appropriate to apply a metallic material with a high thermal conductivity to the outer periphery.

Another method disclosed in Japanese Unexamined Patent Publication No. 1-157083 proposes to provide a resistance heating layer on the outer periphery of a cylinder with a high thermal conductivity, but because the resistance heating layer is exposed, this type of heater cannot cope with a large external load or stress concentrations.

Moreover, a conventional sintering vessel known in the prior art and used for alumina etc. in the field of, for instance, hot pressing, can produce a good sintered product by making the heat transfer to the material uniform. Therefore, with this type of heater, it is effective to use a material with a high thermal conductivity to establish an even distribution of temperature on the inner wall of the vessel. However, even if the aforementioned conventionally used structure is applied without modifications, problems still remain regarding durability such as its resistance to external loads and stress concentrations.

Conventionally, when manufacturing a plastic product using dies, a high-temperature, molten resin is injected into the dies and then cooled, and after curing, the molded product is separated from the dies and removed. At that time, it is preferred that the injected resin should be cooled uniformly. However, there is a tendency that the resin in contact with parts of the dies with thin wall thickness is cooled and cured earlier than the other portions. Consequently, it is preferred that the dies should be heated and cooled evenly.

However, even with these types of dies, there are large external loads as well as large thermal stresses on the inner surfaces of the dies, so the construction described in Japanese Unexamined Patent Publication No. 1-157083 is not sufficient, as in the case of the sintering vessel mentioned above.

As described above, when a conventional block heater is used in heat-printing rollers or dies, the prior art does not present means that can produce a uniform temperature distribution on the surface of the block and can keep the block stable when subjected to external loads, stress concentrations or thermal stresses.

SUMMARY OF THE INVENTION

An object of the present invention is to enable a more uniform heating operation to an object than with the prior art, by generating heat evenly from all the heating surfaces of a heating structure such as a block heater.

Another object of the present invention is to provide a uniform heating structure for the surface of a heating structure that can evenly transfer and absorb heat to and from an object by producing a uniform temperature distribution on the surface, regardless of the magnitude of the external load.

In furtherance of the above objects, there is provided a uniform heating structure in a heating device, consisting of a main block unit made of a heat-resistant metal and provided with a means of heating, and a block heater incorporated in the main block unit; the block heater consists of a material with a higher thermal conductivity than that of the main block unit and is embedded to provide uniform heating.

The aforementioned heat-resistant metal can be stainless steel, an alloy for electric heating or a super alloy with high corrosion and heat resistance, etc. Stainless steel is preferable because of its high durability and small coefficient of thermal expansion. The high thermal-conductivity material with conductivity higher than that of the main block unit, to be used for uniform heating, can be copper, silver, aluminum or gold. In particular, copper is preferred because of its small differential thermal expansion relative to stainless steel.

When a main block unit made of stainless steel is used together with copper as the high thermal conductivity material, it is preferred that the volumetric ratio of the high thermal conductivity material to the block unit is in the range of 20 to 50%. If the ratio of the high thermal-conductivity material exceeds 50%, the resultant strength of the combined unit is low and its durability is poor. If the ratio is less than 20%, the heat-conduction area is insufficient, resulting in a less uniform conduction of heat towards the heat-transmission area.

A heat transfer agent can be used to conduct heat in the area between the high thermal-conductivity material and the main block unit. Any substance such as thermal grease, molybdenum grease, silicon grease or the like can be used for this type of heat transfer agent, and in particular, thermal grease is preferred because of its excellent durability for maintaining good thermal transmission.

There is further provided a uniformly heating structure that incorporates a block heater with at least one heat transmission surface in the main block unit for heating an object, by assembling a heater in the main block unit made of a heat-resistant metal; a heat diffusion plate with a thermal conductivity higher than that of the main block unit, is joined to substantially the whole of the heat transmission surface, in the heating device.

According to the above-mentioned composition, the material of the main block unit can be made of stainless steel or a ceramic, and the heat diffusion plate can be made of either copper, silver, aluminum or gold.

There is still further provided a uniform heating structure in a heating device including a block heater assembled inside a main block unit composed of a heat-resistant metal, and at least one surface of the main block unit is used as a heat transmission surface for heating an object; the uniform heating structure is provided with a built-in heat diffusion plate using a heat transmission material with a higher thermal conductivity than that of the block unit on substantially the whole of the surface, and the heat diffusion plate is joined to substantially all of the above-mentioned heat transmission surface.

Also in this composition, the material of the main block unit can be either stainless steel or a ceramic, and the high thermal-conductivity material can be comprised of either copper, silver, aluminum or gold. In addition, it is also possible to insert the high thermal-conductivity material in a cavity formed in the heat diffusion plate, and to fill the space between the outer surface of the high thermal-conductivity material and the inner surface of the cavity with a viscous heat-conducting agent.

There is yet further provided a uniform heating structure in a heating device made of a heat-resistant metal and formed into a hollow block; the uniform heating structure uses a surface of the heating block as a heat transmission surface, and in the cavity, a high thermal-conductivity material with a thermal conductivity higher than that of the metal material of the heating device, is disposed so that heat can be transferred to the heat transmission surface.

In this configuration, the heating device can consist of a roller drum in which a heater can be housed, and a high thermal-conductivity material can be inserted between the heater and the roller drum. It is also possible to use the device to construct dies, and a high thermal-conductivity material is arranged between a heater assembled in the main die unit and the surface in contact with the molding product.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 12A and FIG. 12B show examples of heating structures containing a plurality of heaters.

FIG. 13A and FIG. 13B show examples of applying the present invention to a hot roller for printing.

FIG. 14A and FIG. 14B show examples of a uniform heating structure in which the temperature distribution is made uniform, at all parts of the roller drum including the end portions.

FIG. 16A and FIG. 16B are examples of a conventional block heater.

DESCRIPTION OF THE PREFERRED EMBODIMENTS

The advantages of the present invention are described practically by referring to the embodiments shown in the drawings.

Figure 1:
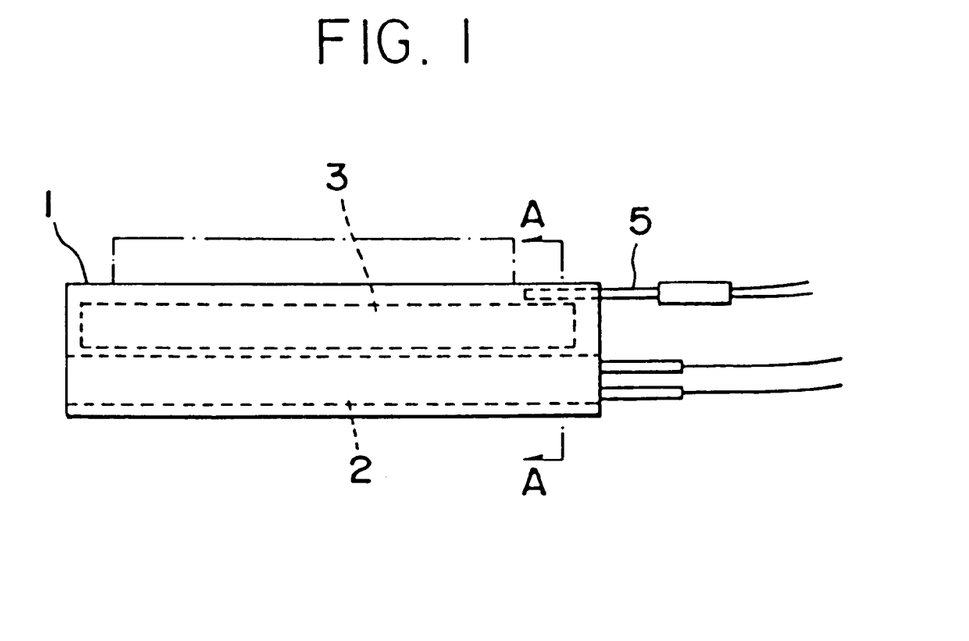
FIG. 1 is a front view of the block heater of an embodiment of the present invention.
Figure 2:
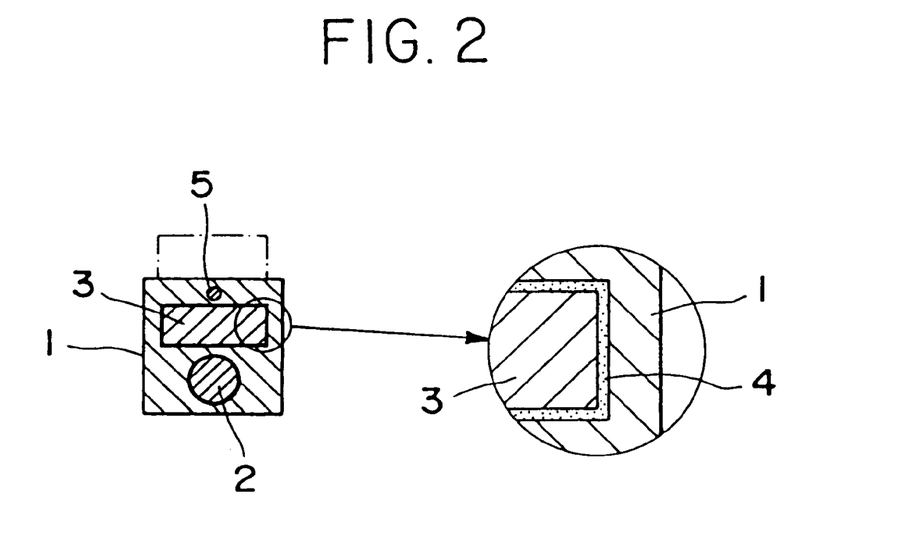
FIG. 2 is a sectional view taken along the line A—A of FIG. 1.
Figure 3:
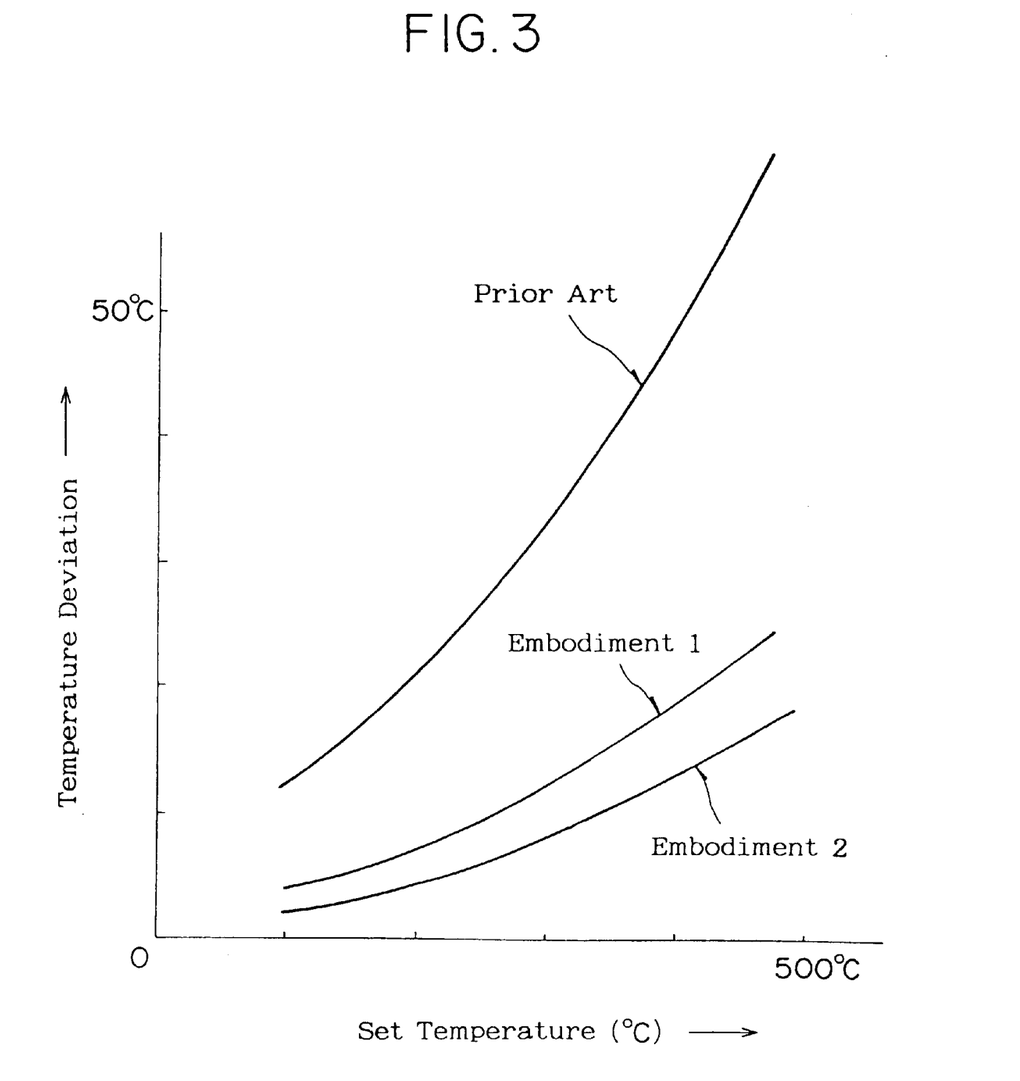
FIG. 3 is a graph showing the experimental results.

FIGS. 1 to 3 illustrate preferred embodiments of the present invention.

In FIGS. 1 and 2, a reference numeral 1 represents a main block unit with dimensions suitable for carrying out a heating operation on the top of the unit, and the block unit is made of heat-resistant stainless steel, in this embodiment, as with the conventional method. A reference numeral 2 is a heater embedded in the main block unit 1, with the same length as the unit 1, and the heater 2 is connected to a temperature controller which is not illustrated.

Above the heater 2, a high thermal-conductivity material 3 made of copper with a thermal conductivity higher than that of the block unit 1, is installed to provide uniform heating, with a volume of about 25% of the volume of the block unit 1, at a depth of 3 mm below the surface of the block unit 1 considering its durability under high temperature conditions. The gaps between the unit 1 and the material 3, are filled with a heat transfer agent 4 (see FIG. 2) consisting of a grease containing a metal oxide to enhance heat transmission. On top of the high thermal-conductivity material 3, a temperature sensor 5 is embedded to measure temperatures of the unit and to feed a controlled gain back to a temperature regulation.

The block heater is manufactured by cutting the main block unit 1 to make the space in which the high heat transmission material 3 is to be embedded, and by applying a heat transmission agent 4 to the entire inner surface of the space, using a brush or spatula. After that, the high heat transmission material 3 is inserted in the cavity, and the joint around the cavity is sealed on the outside by tungsten inert gas arc welding. Next, the heater 2 and the temperature sensor 5 are inserted and fixed in place, thereby finishing the manufacture of the block heater.

To confirm the effectiveness of the present invention, a conventional block heater was manufactured totally of stainless steel, and the embodiment 1 was produced using copper as the high heat transmission material 3 but without using any heat transmission agent 4, and the embodiment 2 was also manufactured using copper as the heat transmission material 3 with the gaps filled with a thermal transmission agent 4 consisting of a thermal grease. A heating test was carried out using these samples.

FIG. 3 presents a graph of the results; set temperatures (° C.) are plotted on the abscissa and temperature deviations (° C.), i.e., the differences between the maximum and minimum temperatures on each heater excluding portions of the heating area 20 mm from the end at the lead wire side and 15 mm from each edge of the top, are plotted on the ordinate, and characteristics of the conventional block heater and the embodiments 1 and 2 of the present invention are compared.

Obviously, both embodiments 1 and 2 exhibit great improvements compared with the conventional heater which has a temperature variation of ±30° C. at a set temperature of 450° C. In particular, with the embodiment 2 in which the thermal transmission agent 4 was used, the variation in the temperature distribution is ±7.5° C. at 450° C., that is, only about 25% of the variation with the conventional heater. Also, the durability of these heaters was tested. As a result, both embodiments 1 and 2 were proved to be operable for substantially the same period as the conventional heater.

FIGS. 4 to 7 show further embodiments of the present invention.

In these figures, a heating device, i.e., a block heater is composed basically of a main block unit 11 in which a flat area on top is made suitable for heat-treating of a predetermined length of a lead frame, for example. This main block unit 11 is made of highly heat-resistant stainless steel to make the unit durable when subjected to repeated thermal stresses. In the illustrated examples, the main block unit 11 has a rectangular parallelepiped shape, and inside each unit, a heater 12 is installed together with connecting leads 12a and 12b for supplying current.

Figure 5:
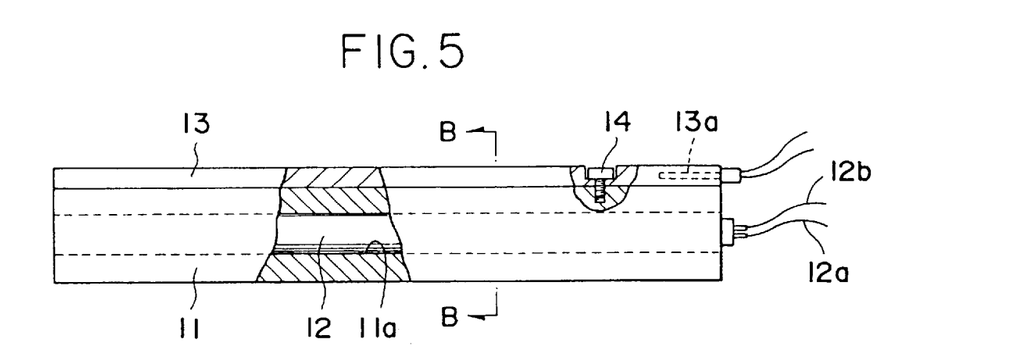
FIG. 5 is a partially sectioned front view of the block heater shown in FIG. 4.
Figure 6:
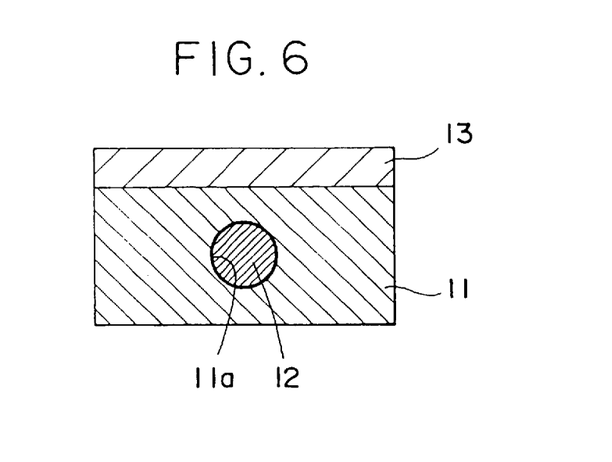
FIG. 6 is a longitudinal sectional view taken along the line B—B of FIG. 5.

The heater 12 is shaped like a circular, cylindrical rod with a uniform outer diameter as shown in FIG. 6, and its length is equal to the total length of the main block unit 1 as shown in FIG. 5. The heater 12 is installed in a mounting hole 11a in the block unit 11 and the inner diameter of the hole tightly fits the heater 12, with only a small dimensional tolerance between them. When the heater 12 is inserted into the mounting hole 11a as shown in FIG. 6, the outer periphery of the heater 12 comes in close contact with the inner surface of the mounting hole 11a, so that a heat transmission surface is formed by both surfaces coming in contact with each other, and heat generated in the heater 12 is transferred through this heat transmission surface to the entire body of the main block unit 11.

At the top of the block unit 11, a heat diffusion plate 13 is attached integrally so that an object to be heated can be heated evenly. The thermal conductivity of the plate 13 is higher than that of the material used for the main block unit 11, and, for example, copper etc. can be used preferably. The heat diffusion plate 13 is flat and is fitted closely to the top surface of the main block unit 11, and the thickness of the plate 13 is such that the plate 13 can act as an accumulator for the heat transferred from the main block unit 11, to some extent. For instance, when the thickness of the block unit 11 (the vertical dimension shown in FIG. 5) is in the range of 40 mm to 50 mm, it is preferred that the thickness of the heat diffusion plate 13 should be approximately 3 mm to 8 mm.

When the heat diffusion plate 13 is made of copper, its high thermal conductivity can be used effectively. When the plate 13 is integrally attached to the block unit 11, all sides of the plate, except for the bottom, are exposed externally, so the plate is coated with a material that will not impede heat transmission to prevent flaws or abrasion. When a metal other than copper, such as hastelloy C or titanium is used, the mechanical strength and resistance to wear are so good that the plate does not need to be coated.

When the heat diffusion plate 13 is made so that it can be detachable to the main block unit 1, the plate can also be mounted on an existing main block unit. For fixing the heat diffusion plate 13 to the main block unit 11, various methods can be used, but it is essential to have a uniform heat transmission from all parts of the heat diffusion plate 13.

Therefore, if for simplicity, screws are used to join the heat diffusion plate 13 and the main block unit 11 together, it is preferred that an excessive number of screws should not be used because each screw location causes a spot-like fluctuation in the even temperature distribution of the heat diffusion plate 13. As a general trend, the amount of heat transferred from the main block unit 11 decreases at both ends, specifically at the edge, in the longitudinal direction (both left and right ends shown in FIG. 5), as compared to the center portion. Therefore, if a hole is drilled for a screw in such an area where the amount of transferred heat is reduced, the effective sectional area of the heat diffusion plate 13 will be further decreased in that area, so that the rate of transferring heat to the outside and the amount of stored heat will also decrease, resulting in a degradation of the uniform heating of the subject to be heated.

Figure 4:
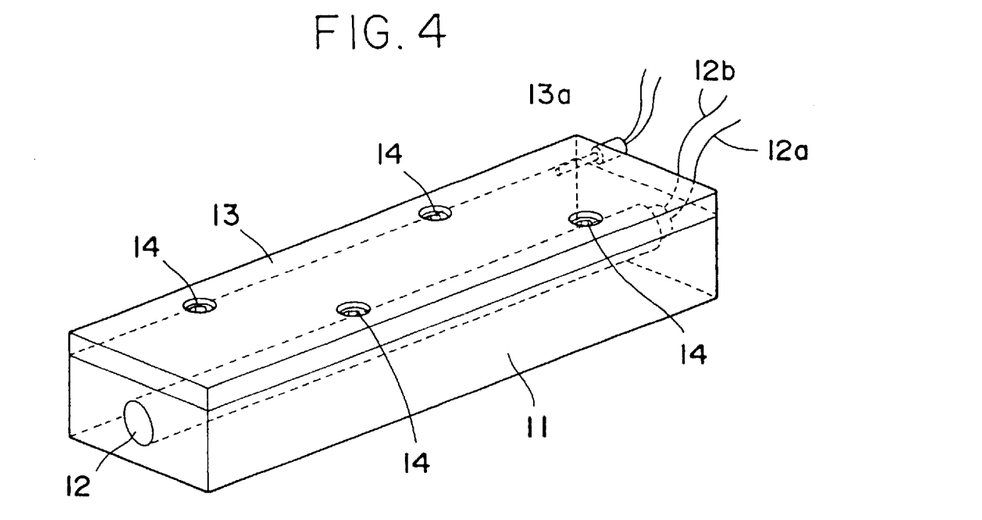
FIG. 4 is a schematic perspective view of the block heater provided with a heat diffusion plate composed of a metal plate mounted on the main block unit.

Therefore, when screws are used for fixing, fluctuations in the uniform temperature distribution in the heat diffusion plate 13 can be considerably reduced by arranging that the four screws 14 should be high tensile bolts arranged substantially in a zigzag pattern and that the screws should be located at a suitable distances from the edges of the heat diffusion plate 13, as shown in FIG. 4. For instance, when the long and short sides of the plate 13 are 200 mm to 300 mm and about 100 mm, respectively, the preferred distance from the outer periphery to the screw 14 is about 15 mm.

Figure 7:
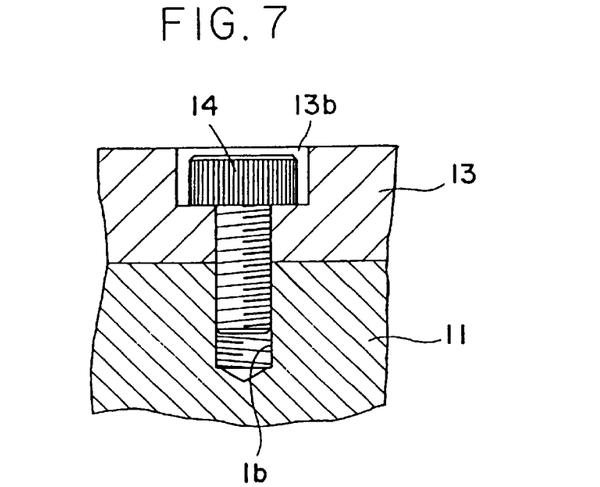
FIG. 7 is a longitudinal sectional view that shows the essential portions of the attachment method for a heat diffusion plate using screws.

Details of the method of fixing with screws 14 are shown in FIG. 7; a countersunk screw hole 13b is drilled in the heat diffusion plate 13, and a tapped hole 11b is provided in the top of the main block unit 11. Therefore, even if the main block unit 11 is an existing product, it can be modified to a block heater with the heat diffusion plate 13, simply by drilling the tapped holes 11b. For this purpose, the screws 14 to be used are preferably high-tensile bolts with a high thermal conductivity.

Furthermore, a temperature sensor 13a such as a thermocouple is inserted into from the longitudinal side surface of the heat diffusion plate 13 to be fixed thereto, and a signal from the temperature sensor 13a is sent to a control unit, so that the amount of current supplied to the heater 12 is controlled.

In the above-mentioned configuration, when the heater 12 is energized, the generated heat is transferred from the top of the main block unit 11 to the heat diffusion plate 13, from which the heat is dissipated. In this configuration, the heat conductivity of the plate 13 is higher than that of the unit 11. Therefore, a more uniform temperature distribution is established at all parts of the heat diffusion plate 13, compared to the case in which the heat is dissipated directly from the main block unit 11.

As described earlier, when the heater 12 is embedded in the main block unit 11, the amount of heat transferred from the outer edges of the block unit 11 to the heat diffusion plate 13, particularly from both ends in the longitudinal direction due to the large heat dissipation outside, is less than that from the center portion. However, because the thermal conductivity of the plate 13 is high, the entire body of the plate is heated uniformly even if the temperature distribution on the surface of the main block unit 11 is uneven, therefore the temperature difference between the center portion and the ends can be reduced to a minimum. Also, even if the heat diffusion plate 13 is fixed with the screws 14, the screws do not adversely affect the temperature distribution as described previously, and no temperature difference will occur.

In the aforementioned way, an object to be heated can be uniformly heated simply by arranging so that the heat diffusion plate 13 with a high thermal conductivity is provided on the surface of the main block unit 11, and the composite structure can be used advantageously in the equipment for a semiconductor manufacturing process, such as a chip bonding process. The mechanical strength of the heat diffusion plate 13 deteriorates because of oxidation caused by heating, and wear occurs on the surface of the plate because of external stresses. However, by simply replacing the plate periodically, uniform heating with the heat diffusion plate 13 can be maintained for a long time.

FIGS. 8 to 12 show yet further embodiments of the invention.

In these examples, the main block unit 21, the heater 22, etc. are the same as those shown in FIGS. 4 to 7, except that the configuration of the heat diffusion plate is changed. That is, the heat diffusion plate 25 to be fixed on the top of the main block unit 21 is formed by assembling a high thermal-conductivity material 26 in a hollow portion 25a created by making cuts inside part of the block unit 21. This high thermal-conductivity material 26 allows the temperature distribution on the surface of the entire heat diffusion plate 25 to become uniform.

Preferably, the heat diffusion plate 25 should have a high thermal conductivity, but priority is given to its mechanical strength and resistance to abrasion; for instance, stainless steel can be utilized. In addition, a heat transmission agent 27 (see FIG. 9) is applied to the inner surfaces of the hollow portion 25a, to enhance heat transmission between the heat diffusion plate 25 and the high thermal-conductivity material 26. The heat transmission agent 27 can be grease that includes a metal oxide for increasing thermal conductivity.

Figure 9:
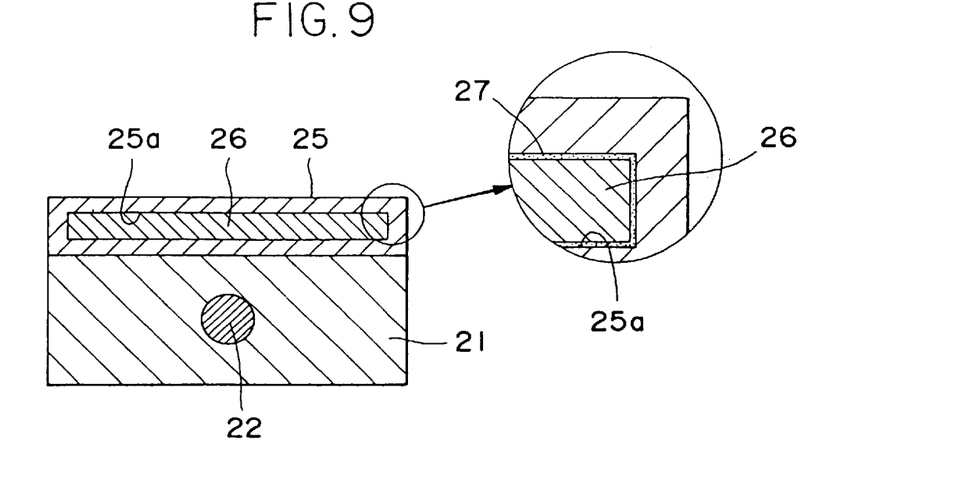
FIG. 9 is a longitudinal sectional view taken along the line C—C of FIG. 8.

The metal oxide not only increases the heat conduction, but also makes it easy to insert the high thermal-conductivity material 26 into the hollow portion 25a because of the lubricating and viscous characteristics associated with the grease. As a result, it is possible to allow for any dimensional errors, and to assemble the plate and the unit smoothly.

After the high thermal-conductivity material 26 has been completely inserted into the hollow portion 25a, the open end of the hollow portion 25a is sealed by, for example, tungsten inert gas welding, and a temperature sensor 25b is provided to measure the temperature of the heat diffusion plate 25, in the same way as the above-mentioned examples.

The high thermal-conductivity material 26 can consist of copper, like the heat diffusion plate 23 shown in the above-mentioned example; when the thickness of the plate 25 is in the range of 8 mm to 10 mm, the preferred thickness of the high thermal-conductivity material 26 is in the range of 4 mm to 6 mm, approximately.

Figure 8:
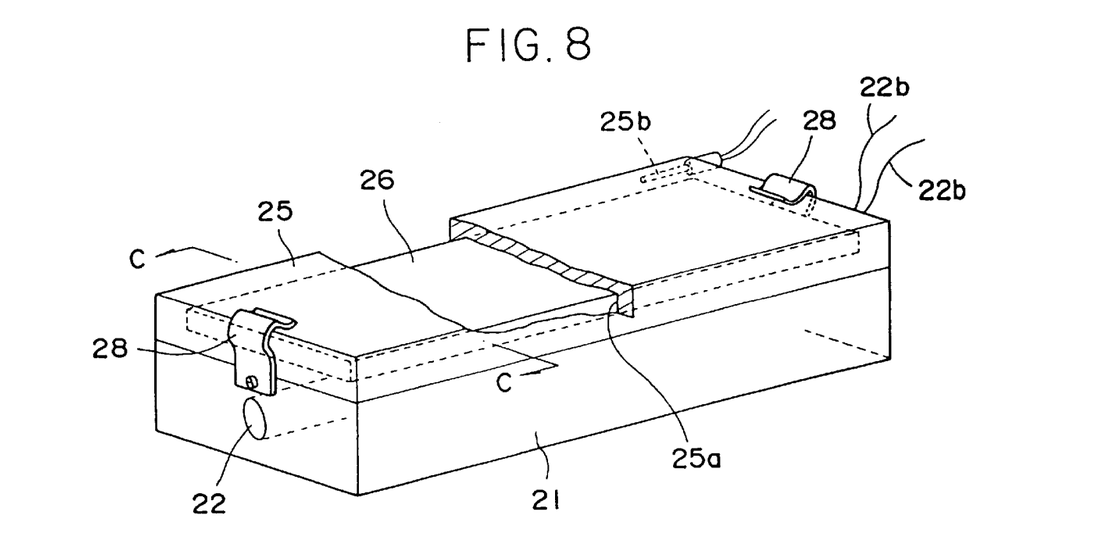
FIG. 8 is a schematic perspective view of a block heater with a heat diffusion plate in which a high heat transmission material is built into the main block unit.

As devices for fixing the heat diffusion plate 25 onto the main block unit 21, clamp arms 28 made of a resilient material such as a spring material, in place of the screws in the previous example, are provided at the ends of the main block unit 21 in the longitudinal direction.

Figure 10A:
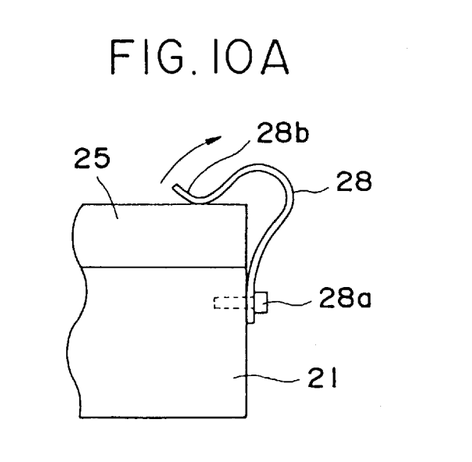
FIG. 10A, FIG. 10B and FIG. 10C are sketches of the essential portions that fix heat diffusion plate to a main block unit with a variety of clamp arms, respectively.
Figure 10B:
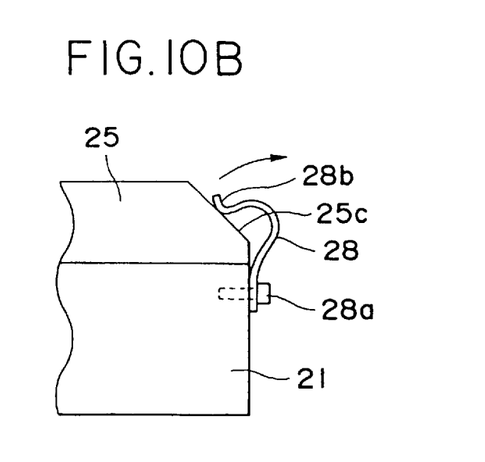
Figure 10C:
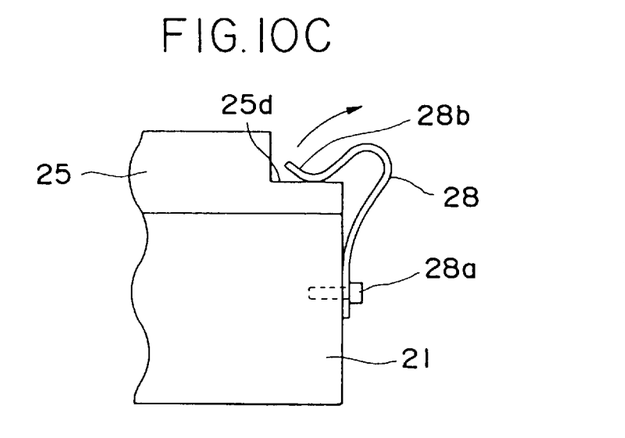

FIGS. 10A to FIG. 10C show sketches of three types of clamp arms 28; FIG. 10A corresponds to the clamp arm 28 used in the example shown in FIG. 8. The base end of this clamp arm 28 is fixed to an end surface of the main block unit 21 by means of a screw 28a, and the arm gently curves upwards from the base, and the top of the arm is formed into a hook 28b which exerts a downwards force. The hook 28b is placed over the top of the heat diffusion plate 25, and presses down on the plate, so that the bottom of the heat diffusion plate 25 is in close contact with the top of the main block unit 21. When the hook 28b is pulled upwards, the clamp arm 28 deforms upward elastically to release the plate 25 to be free from the main block unit 21. Thus, the heat diffusion plate 25 can be removed from the main block unit 21.

FIG. 10B shows another type of fixing; the side of the heat diffusion plate 25 is shaped into an inclined plane 25c, and the hook 28b of the clamp arm 28 contacts the plane 25c so that the hook does not protrude above the top surface of the heat diffusion plate 25. FIG. 10C shows another method of fixing in which a step 25d is formed in the side of the plate 25. The hook 28b of the clamp arm 28 contacts this step 25d, thereby preventing the clamp arm 28 from protruding above the heat diffusion plate 25, like the example in FIG. 10B. Using this configuration without a protruding hook, lead frames can be placed on the top of the heat diffusion plate 25, without interference between the clamp arm 28 and the lead frames, therefore the configuration can also be applied for a heating process in a continuous processing line.

Moreover, the clamp arm 28 only presses a part of the main block unit 21 and the heat diffusion plate 25 at the ends of longitudinal directions. Therefore, the heat transferred from the main block unit 21 to the heat diffusion plate 25 through the clamp arms 28, can be made less than that through the screws used in the above-mentioned example, so the temperature distribution on the whole of the heat diffusion plate 25 can be made more uniform than in case of the above example.

A uniform heating structure which includes the heat diffusion plate 25 with a sealed high thermal-conductivity material 26, can distribute heat from the main block unit 21 over the whole body of the heat diffusion plate 25, by virtue of the built-in high thermal-conductivity material 26 incorporated in the heat diffusion plate 25, even if the plate itself does not have a high thermal conductivity. Consequently, the heat diffusion plate 25 allows an object to be uniformly heated, and when the heat diffusion plate 25 consists of a mechanically strong, highly abrasion-resistant material, the plate can also be used as the outer component.

The heat diffusion plate 25 with a built-in high thermal-conductivity material 26 can be used not only by being fixed on the main clock unit 21 as shown in FIG. 4 to FIG. 10C, but also with other sources of heat such as a burner. When an object to be heated is heated directly by a burner, it is difficult to heat the object uniformly because of the behaviors of the flame, varying combustion rate. However, by maintaining the heat diffusion plate 5 exposed to the object using a suitable jig, the plate receives heat from the burner, distributes the heat evenly, and heats the object.

Figure 11:
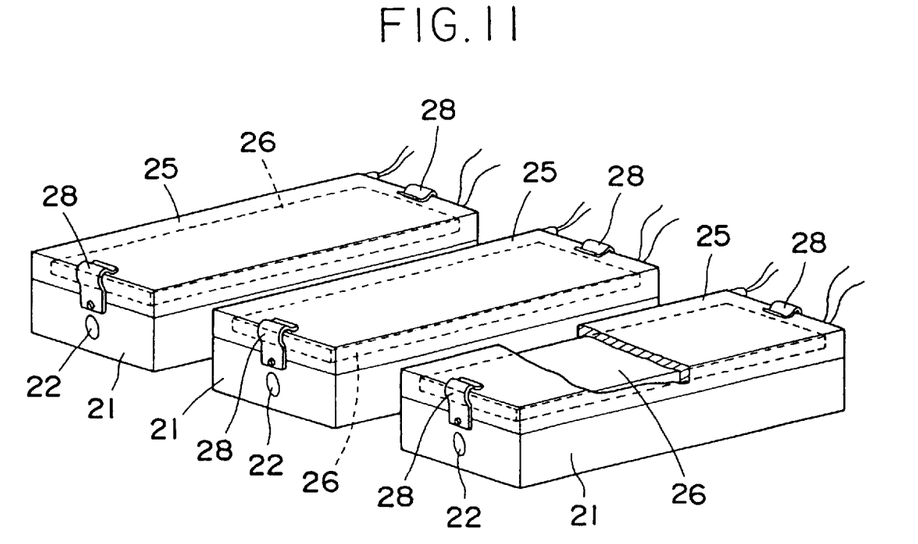
FIG. 11 is a schematic perspective view that shows a heating unit consisting of three of the block heaters shown in FIG. 8, arranged closely to each other.

FIG. 11 is a sketch showing a heating unit consisting of a plurality of block heaters shown in FIG. 8.

In this heating unit, three block heaters are arranged with equal spacing therebetween and the same alignment thereof. In this type of heating unit, each heat diffusion plate 25 can have the same temperature distribution, so the block heaters do not interfere thermally with each other even when the same current is applied to each of the heaters 22 with the same heating temperatures from the heat diffusion plates 25.

If the temperature distribution is not uniform throughout the heat diffusion plates 25, heat is locally transferred to a low-temperature heat diffusion plate 25 from another adjacent high-temperature heat diffusion plate 25, and the temperatures of all heat diffusion plates 25 are gradually changed to be in a steady state. Therefore, from the viewpoint of the heating unit itself, the total amount of dissipated heat fluctuates from the predetermined value and, therefore, heating temperatures must be controlled more precisely.

On the other hand, the heat diffusion plate 25 with a built-in thermal heat-conductivity material 26 can produce a uniform temperature distribution, so even if a plurality of the plates are arranged into one heating unit, there is no thermal interference between them. Hence, variations in the total amount of heat dissipated from the heating unit can be eliminated, which results in a heating operation at the required, optimum temperature for heating an object. Also when several block heaters are closely arranged into one unit, no thermal interference can occur between each of the thermal diffusion plates 25, so that such a unit can work satisfactorily when a large amount of heat is required or a wide heating area is needed for heating an object.

Figures 12A, 12B:
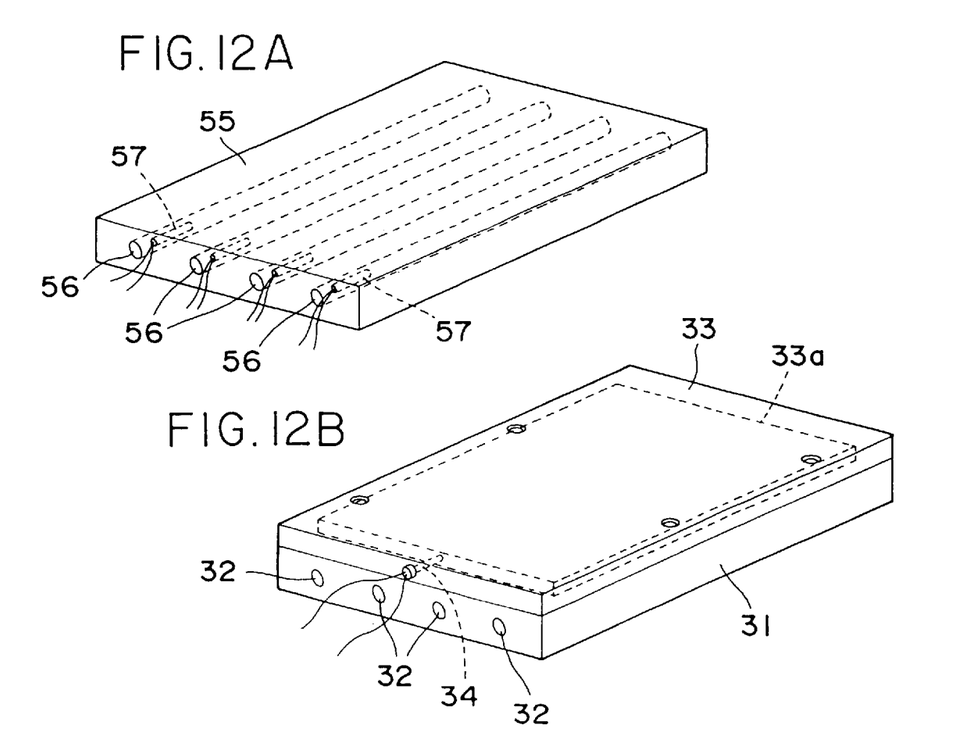
FIG. 12A is a schematic perspective view showing an application using a conventional structure.
FIG. 12B is a perspective view showing an example of a high thermal-conductivity material embedded in a heat diffusion plate.

FIG. 12A and FIG. 12B are schematic perspective views of a conventional heater block known in the prior art and another heater block in which the heating area was made larger according to the present invention.

FIG. 12A is a view showing a conventional structure; a main block unit 55 is provided with four heaters 56, and the main block unit 55 works as the heat transfer surface for heating an object. According to this configuration, the heat transmission surface is heated by the combined heat from the four heaters 56. If the main block unit 55 consists of a material with rather low heat conductivity, such as stainless steel, it is difficult to obtain a uniform temperature distribution on the heat transmission surface. Therefore, to detect temperatures on the heat transmission surface more precisely, four temperature sensors 57 are embedded in positions corresponding to each heater 56 as shown in FIG. 12A, and the temperatures measured by these temperature sensors 57 are summed to define the temperature distribution on the heat transmission surface.

FIG. 12B is a view of the main block unit shown in FIG. 8, after increasing the width and the heat transfer surface. In this example, four heaters 32 are arranged in parallel to each other in the block unit 31, and a heat diffusion plate 33 is interposed between these heaters 32 and the top heat transmission surface. The heat diffusion plate 33 is provided with a high thermal-conductivity material 33a inside the plate, like the previous example of FIG. 8; the high thermal-conductivity material 33a is arranged so as to cover the whole area of the four heaters. The plate receives heat from each heater 32, and the high thermal conductivity material 33a uniformly transfers the heat towards the heat transfer surface. Hence, the entire body between the heat diffusion plate 33 and the heat transmission surface is heated to have a uniform temperature distribution.

The heat diffusion plate 33 can be joined to the main block unit 31 using the same clamp arms as those shown in FIG. 8, and sufficient clamping force can be obtained if the width of the clamps is increased.

Even if a plurality of heaters 32 are arranged as described above, the heat diffusion plate 33 is able to make the temperature distribution uniform. Therefore, by embedding a temperature sensor 34 at the center in the width direction of the plate 33, for instance, the temperature of the heat transmission surface of the main block unit 31 can be measured precisely. Consequently, unlike the conventional structure shown in FIG. 12A, it is sufficient to provide one temperature sensor 34, so that the circuit for controlling temperatures can be simplified, and the cost can also be reduced.

FIGS. 13A to 15 are views showing still further embodiments of the present invention.

Figure 13A:
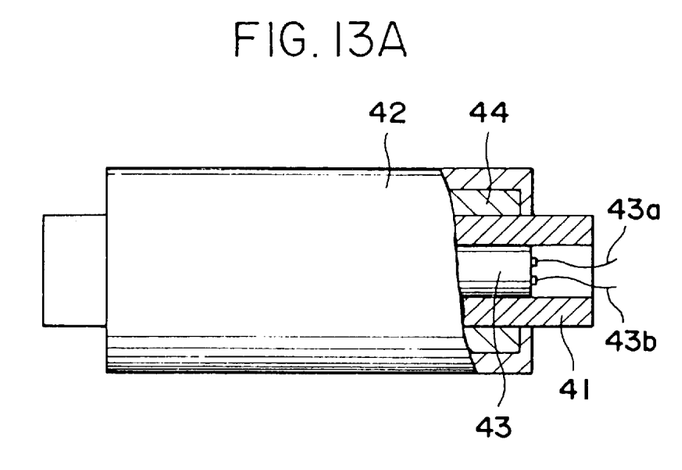
FIG. 13A is an approximate side view.
Figure 13B:
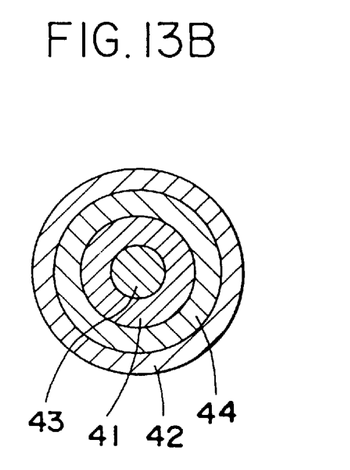
FIG. 13B is a cross-sectional view of the essential portions.

In FIGS. 13A and 13B, the embodiment is provided with a hollow shaft 41 and a roller drum 42 with high rigidity that forms the outer member. A heater 43 is inserted into the hollow shaft 41, and a heat transfer sleeve 44 is installed between the hollow shaft 41 and the roller drum 42.

The hollow shaft 41 and the roller drum 42 are made of, for instance, stainless steel in order to have high mechanical strength and rigidity, so that the shaft and the drum can satisfactorily withstand large external loads and stress concentrations. The use of stainless steel results in a rather high resistance to repeated thermal stresses, so that the surface properties of the roller drum 42, in particular, will not change with time. As a result, uniformheating of an object being heated such as a paper sheet in contact with the surface of the roller drum 42, can be maintained. According to the illustrated example, only the hollow shaft 41 is longer than the other members, and the equipment is supported by bearings at both ends of the shaft 41.

The heater 43 is shaped like a rod with a uniform outer diameter and a circular cross section, and the heater 43 is in close contact with the hollow shaft 41, so that the contact surface is used for heat transfer. At one end of the shaft, the lead wires 43a and 43b are connected to the heater and protrude from the end of the hollow shaft 41. These lead wires 43a, 43b are connected to an external circuit (not shown) through rotating contacts in a connector at the junction with the heater 43, so that the lead wires are not twisted when the roller rotates. By connecting lead wires 43a, 43b to a temperature-controlling device (not illustrated), the amount of heat produced by the heater 43 can be adjusted.

The heat transmission sleeve 44 has a higher thermal conductivity than that of the materials used for the hollow shaft 41 and the roller drum 42, and the sleeve can consist advantageously of copper or aluminum, for instance. The heat transmission sleeve 44 is in close contact with the outer surface of the hollow shaft 41 and the inner surface of the roller drum 42, and has a sectional shape which allows heat to be transferred to and from the hollow shaft 41 and the roller drum 42. As illustrated, both ends of the sleeve in the axial direction are covered by the roller drum 42 and are not exposed outside. The thickness of the sleeve 44 is designed so that the sleeve acts as an accumulator that can store heat transferred from the hollow shaft 41, to some extent. For example, when the outer diameter of the hollow shaft 41 is in the range of 100 mm to 200 mm, the preferred wall thickness of the heat transmission sleeve 44 is in the range of 20 mm to 40 mm, approximately.

When a current is applied to the heater 43, the heat produced is transferred to the hollow shaft 41 and to the roller drum 42, i.e. the outer covering. When heat is transferred, the heat transfer sleeve 44 helps to make the heat transmission into the whole body of the roller drum 42 uniform because the sleeve has a high thermal conductivity and is in close contact with the outer surface of the hollow shaft 41, resulting in uniform temperature distribution on the outer surface.

Because the heat transmission sleeve 44 has a higher thermal conductivity than those of the hollow shaft 41 and the roller drum 42, the roller drum 42 is heated with a more uniform temperature distribution by the heat dissipation effect of the sleeve 44, than for the case where the roller drum 42 is directly heated by the heater 43, for instance. Therefore, when an object to be heated moves in contact with the surface of the roller drum 42, no irregularity occurs in heating, and the object can be heated uniformly.

As the outer surface of the hot roller is made of stainless steel, the roller drum 42 has sufficient mechanical strength against external loads or stress concentrations, so the roller will operate normally even if a large load is applied from an object to be heated, which comes in contact with the periphery of the roller drum 42. In addition, the hollow shaft 41, supported by bearings, also has a high mechanical strength; therefore, deflection and torsion of the shaft can be avoided. Consequently, the hollow shaft 41 and the roller drum 42 enable themselves to restrain deformation when reaction force is loaded from the object to be heated, without deformation, so the surfaces which transfer heat from the heat transfer sleeve 44 remain in close contact, heat transmission is stable all the time, and uniform heating is maintained at the surface of the roller drum 42.

If the heater 43 is inserted in the hollow shaft 41 and if both ends of the shaft 41 protrude more than the other components as shown in FIG. 13A, heat received by the hollow shaft 41 may easily dissipates from this protruding portion. Also, both ends of the roller drum 42 are exposed to the outside, so heat is also lost from the end portions. Therefore, when the hot roller is (considered as a whole, more heat is dissipated from the end portions than from the center portion, so the surface temperatures at the end portions of the roller drum 42 tend to be lower than the temperature at the center portion, because of the aforementioned difference in heat dissipation.

Figure 14A:
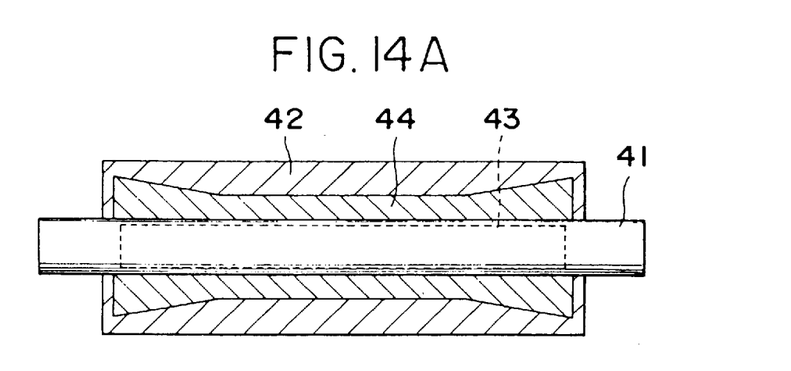
FIG. 14A is a longitudinal sectional view of the essential portions with a heat transmission sleeve that is thickened at both ends.
Figure 14B:
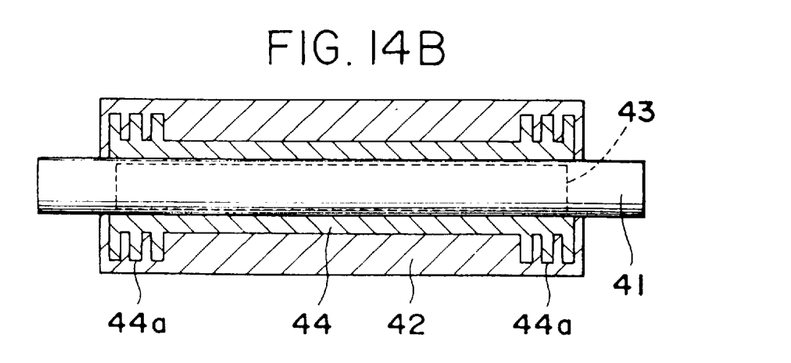
FIG. 14B is a longitudinal sectional view of the essential portions for an example of a uniform heating structure with a heat transmission sleeve equipped with fins at both ends.

Such defect on the temperature distribution can be easily corrected by modifying the shape of the heat transmission sleeve 44 to one of those shown in FIGS. 14A and 14B.

FIG. 14A is an example in which the wall thickness of the heat transfer sleeve 44 is varied axially; as illustrated, the wall thickness is smallest at the center portion and becomes larger towards the end portions. Using this type of heat transfer sleeve 44, the heat transferred from the heater 43 increases as the wall thickness is increased, and also more heat is stored in the sleeve. Thus, the amount of heat transferred can he adjusted to compensate for the amount of heat dissipated at both ends of the roller drum 42. As a result, the temperature differences between the center portion and the ends of the roller drum 42 can be eliminated, and the temperature distribution over the entire length of the roller drum 42 in the axial direction can be made uniform.

FIG. 14B gives an example in which a plurality of fins 44a are formed on the outer surface at the ends of the heat transfer sleeve 44 in the axial direction. These fins 44a can increase the amount of heat transferred at both end portions of the roller drum 42 compared to that in the center portion, and so the fins compensate for the amount of heat dissipated near both end portions in the same way as for example of FIG. 14A, and the temperature distribution on the roller drum 42 can be made uniform.

As mentioned above, the wall thickness is gradually increased towards both ends of the heat transmission sleeve 44 in the axial direction, or fins 44a are provided, so that it is unnecessary to provide insulation at the ends of the roller drum 42 and the heater 43 themselves. Hence, the structure of the roller can be simplified, that is, the heater 43 can be inserted into the hollow shaft 41 and it is no longer necessary to do any assembly work on a hot roller when it is being installed into a printing machine.

Figure 15:
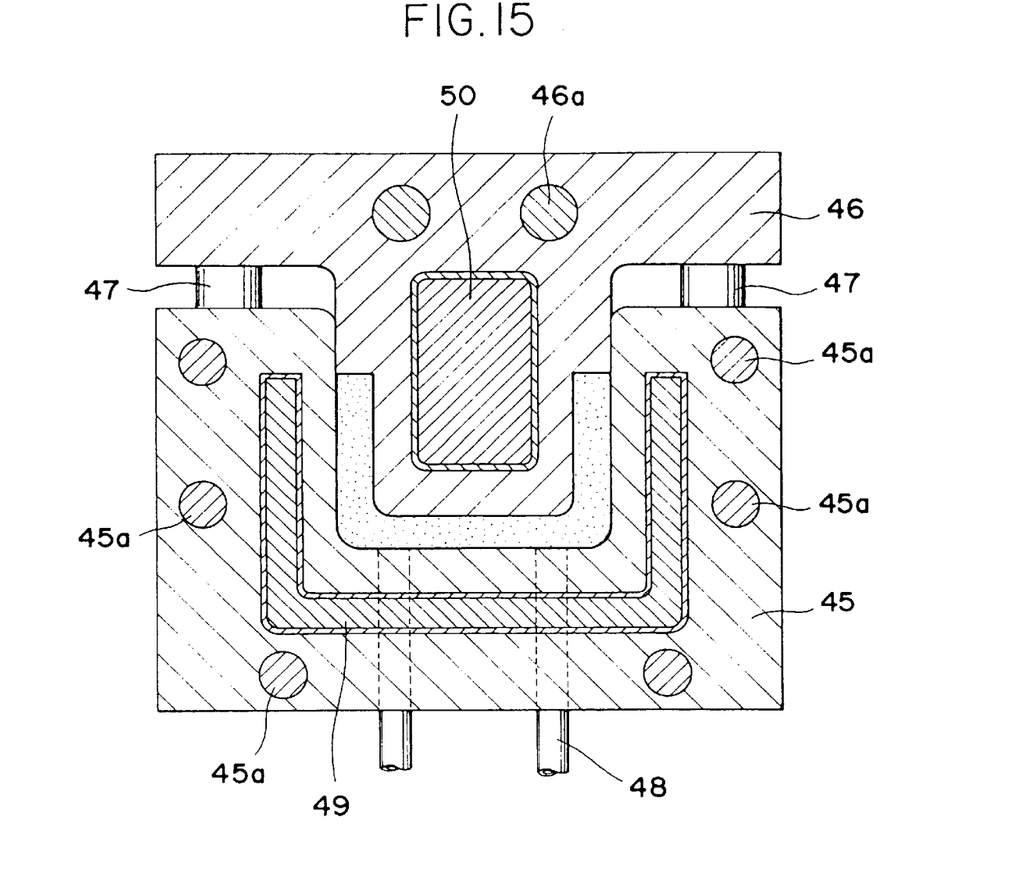
FIG. 15 is an approximate longitudinal sectional view of the essential portions for an example in which the present invention is applied to dies for molding synthetic resin products.

FIG. 15 shows an example of a heating device for dies according to the present invention, which can be applied to the manufacture of a resin molding.

The device consists of a combination of a lower die 45 and an upper die 46; the lower die 45 has the shape of a recessed cavity, and the upper die 46 is shaped as a convex core facing downwards. The lower die 45 and upper die 46 are connected by guide pins 47, and the lower die 45 is provided with ejector pins 48 for removing a molded product.

The lower die 45 and the upper die 46 consist of a heat-resistant metal conventionally used for manufacturing dies used to produce synthetic resin moldings; for example, hastelloy C, SKD 11, etc. can be used. As in the case of conventional die, used for molding resin, a plurality of heaters 45a and 46a are assembled in the lower die 45 and the upper die 46. The heaters 45a and 46a consist, for example, of rod heaters with a circular cross section, and the heaters generate heat which is transferred to the molding space, formed by the cavity in the lower die 45 and the core of the upper die 46 (the space is indicated as a U-shaped space in FIG. 15), and a U-shaped molded product is manufactured with the dies by inserting the upper die 46 downwards under pressure, after charging with molten resin.

To make uniform the amount of heat transferred from the several heaters 45a and 46a to the whole molding space, high thermal-conductivity materials 49 and 50 are incorporated in the lower die 45 and the upper die 46, respectively. Because these high thermal-conductivity materials 49 and 50 have the thermal conductivity higher than those of the lower die 45 and the upper die 46, typically copper or aluminum can be used as in the aforementioned examples.

The high heat-conductivity material 49 incorporated in the lower die 45 has a substantially U-shape form which follows the shape of the wall of the molding space, extending in a direction perpendicular to the paper in FIG. 15, and assembled with such a shape that it uniformly encloses the molding space including both ends of the mold. All heaters 45a are distributed outside the high thermal-conductivity material 49.

The high thermal-conductivity material 50 in the upper die 46 is shaped as a block with a rectangular cross section in the longitudinal direction, and partially enters the molding space. All the heaters 46a are installed in a distributed manner outside the high thermal-conductivity material 50, as with the lower die 45.

For the lower die 45, the heaters 45a and the high thermal-conductivity material 49 are located and arranged appropriately so that the heat from each heater 45a can be transferred uniformly to the area surrounding the molding space in which the molded product is produced. The same arrangements are also required for the heaters 46a and the high thermal-conductivity material 50 in the upper die 46.

In the dies constructed using the high heat-conductivity materials 49, 50 in the lower die 45 and the upper die 46, respectively, when the lower die 45 and the upper die 46 are heated by the heaters 45a, 46a, the area surrounding the molding space in which the molded product is produced is uniformly heated by the high thermal-conductivity materials 49 and 50 in the same way as for the above-mentioned hot roller. Therefore, even if the heaters 45a and 46a are disposed somewhat irregularly, the inner surface temperature of the molding space which is formed into a U-shaped section by the core and the cavity, can he made even, so that the charge of molten resin is heated uniformly. A predetermined time after injecting the resin, when heating by the heaters 45a and 46a is stopped allows the molten resin to cool naturally, thereby producing a molded product.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A uniform heating structure with a planar heat transfer surface comprising:

a square or rectangular cross-sectioned main block unit comprising a heat-resistant metal, and having a planar heat transfer surface with a surface area, a heater completely embedded in the main block unit, a high thermal-conductivity material interposed between the heat transfer surface and the heater and having a thermal conducting area approximately corresponding to the surface area of planar heat transfer surface.

2. The uniform heating structure as set forth in claim 1, wherein said heat-resistant metal comprises stainless steel, and said high thermal-conductivity material comprises a material selected from the group consisting of copper, silver, aluminum and gold.

3. The uniform heating structure as set forth in claim 1, wherein said high thermal conductivity material is sealed in said main block unit with a heat transmission agent selected from the group consisting of a thermal grease, a molybdenum grease and a silicon grease.

4. The uniform heating structure as set forth in claim 2, wherein said high thermal conductivity material is sealed in said main block unit with a heat transmission agent selected from the group consisting of a thermal grease, a molybdenum grease and a silicon grease.

5. A uniform heating structure with a planar heat transfer surface comprising:

a square or rectangular cross-sectioned main block unit comprising a heat-resistant metal, and having a planar heat transfer surface with a surface area, a heater embedded in the main block unit, a heat diffusion plate removably attached to the heat transfer surface, wherein the heat diffusion plate has a thermal conductivity higher than a thermal conductivity of the main block unit, and is thermally contacted with approximately the entire surface area of the planar heat transfer surface.

6. The uniform heating structure as set forth in claim 5, wherein said main block unit comprises stainless steel or a ceramic, and said heat diffusion plate comprises a material selected from the group consisting of copper, silver, aluminum and gold.

7. A uniform heating structure with a planar heat transfer surface comprising:

a square or rectangular cross-sectioned main block unit comprising a heat-resistant metal, and having a planar heat transfer surface with a surface area, a heater embedded in the main block unit, a heat diffusion plate removably attached to the heat transfer surface, and defining a hollow portion therein, wherein the heat diffusion plate has a thermal conductivity higher than a thermal conductivity of the main block unit, and is thermally contacted with approximately the entire surface area of the planar heat transfer surface;

a high thermal-conductivity material disposed in the hollow portion of the heat diffusion plate and having a thermal conductivity greater than that of the heat diffusion plate and a thermal conducting area approximately corresponding to the surface area of the planar heat transfer surface.

8. The uniform heating structure as set forth in claim 7, wherein said main block unit comprises stainless steel or a ceramic, and said high thermal-conductivity material comprises a material selected from the group consisting of copper, silver, aluminum and gold.

9. The uniform heating structure as set forth in claim 7, further comprising a viscous heat transmission agent sealing said high thermal-conductivity material in said hollow portion.

10. The uniform heating structure as set forth in claim 8, further comprising a viscous heat transmission agent sealing said high thermal-conductivity material in said hollow portion.

* * * * *